Aug. 8, 1944.  D. K. KOSICH  2,355,447
AIRCRAFT DESTROYER
Filed March 1, 1943
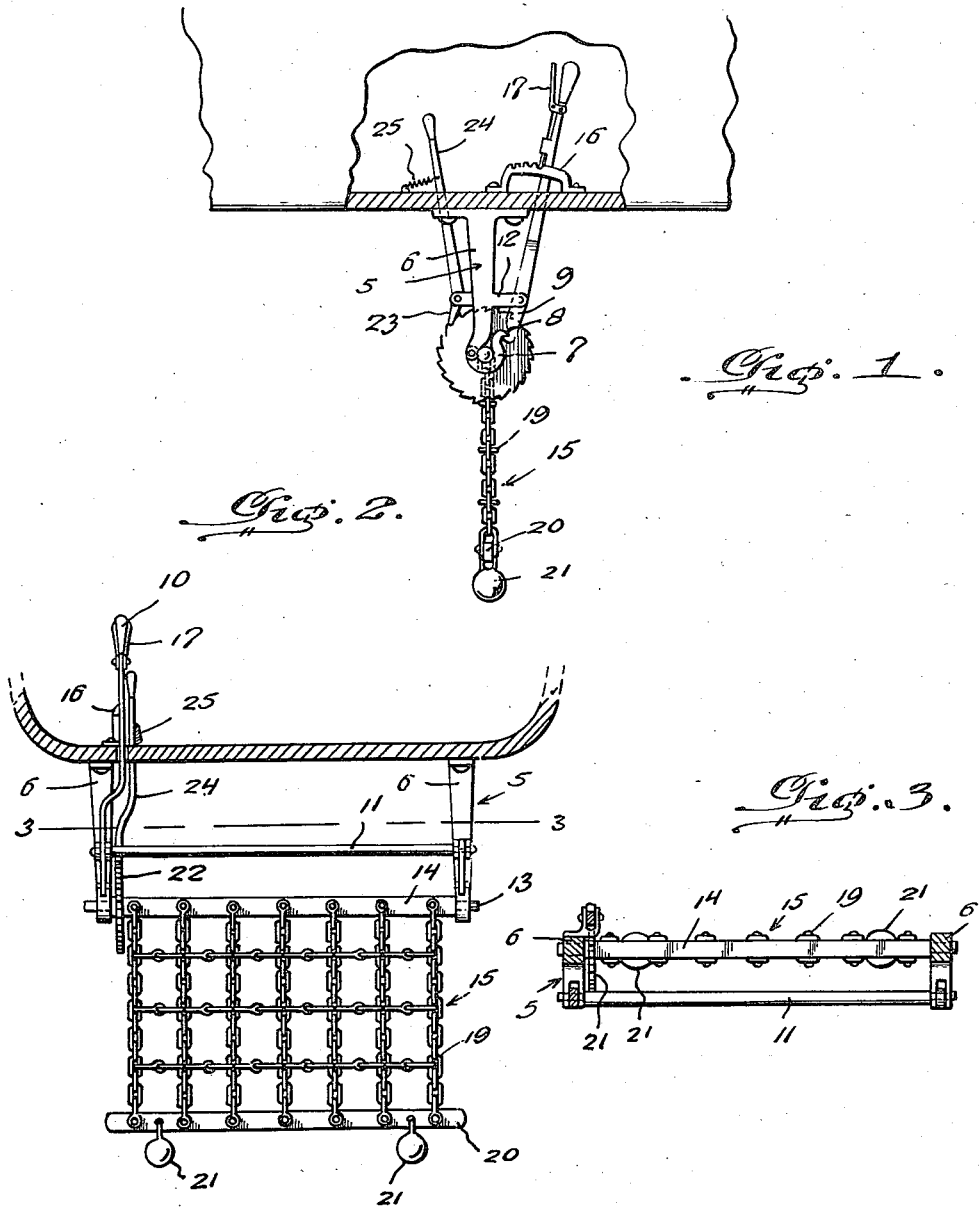
Inventor
Dimitri K. Kosich,
By McMorrow and Berman
Attorneys Patented Aug. 8, 1944

2,355,447

UNITED STATES PATENT OFFICE 2,355,447

AIRCRAFT DESTROYER

Dimitri K. Kosich, Hales Corners, Wis.

Application March 1, 1943, Serial No. 477,577

1 Claim. (Cl. 89—1)

This invention relates to an aircraft destroyer, and more particularly to a device especially adaptable for aiding a pilot in aerial combat with an opponent by disabling the opponent's aeroplane.

The primary object of this invention is the provision of a device of the above stated character which may be easily installed on an aeroplane now in use and which will not interfere with the functioning of the aeroplane and may be quickly brought into operative position when need therefor occurs and released from said aeroplane for entanglement in the propeller or propellers of the enemy aircraft, so that said enemy aircraft will be rendered inoperative or disabled so that its descent to destruction cannot well be avoided.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary and elevation, partly in section illustrating the present invention applied to a fragmentary portion of an aeroplane.

Figure 2 is a side elevation, partly in section, showing the device in operative position.

Figure 3 is a sectional view taken on the line 3—3 of Figure 1.

Referring in detail to the drawing, the numeral 5 indicates a hanger which may be suitably secured to an aircraft or aeroplane, either on its wing construction or body or fuselage and consists of a pair of depending brackets 6 each having its lower terminal in the form of a pivotal hook-shaped bearing 7, the free end of which includes a bill portion 8 to be engaged by dogs 9, one of which forms an integral part of a control lever 10 and the other is secured to a shaft 11 on which the control lever 10 is secured. Ears 12 are formed on the brackets 6 and rotatably support the shaft 11.

The hook-shaped pivotal bearings 7 receive pintles 13 of a rigid rod 14 forming a part of an entangling structure 15.

The control lever operates in conjunction with a quadrant 16 and is provided with a detent 17 for coaction with the quadrant in releasably securing the control lever 10.

The entangling structure 15 besides including the bar 14 consists of a chain mesh 19 and a rigid bar 20 to which weights 21 are secured. The chain mesh is adapted to be normally wound on the bar 14 positioning the bar 20 close to the bar 14.

A ratchet gear 22 is secured to the bar 14 and is engaged by a hand operated pawl 23 that includes a hand lever 24. A spring 25 is connected to the hand lever and to the aeroplane for holding the bar in engagement with the ratchet gear. This construction will prevent the entangling construction from unwinding and sustain the same in an operative position ready to be released by the pilot of the aeroplane when need therefor occurs.

It is preferable that the hand levers 24 and 10 be closely associated so that the pilot can easily operate either of said levers.

In operation, the entangling construction 15 is kept in rolled form and when the pilot of the aeroplane becomes engaged in aerial combat with the pilot of another aeroplane, the hand lever 24 is operated to permit unwinding of the entangling structure as soon as the pilot of the plane maneuvers into a position over the opponent's aeroplane, and when the pilot of the respective aeroplane maneuvers above and slightly in advance of the opponent's aeroplane the hand lever 10 is operated, releasing the entire entangling structure so that it may fall into the propeller or propellers of the opponent's aeroplane, disabling the latter named aeroplane so that its descent will be compelled. When the enemy aeroplane has been disabled as specified, its descent to destruction cannot then be easily avoided.

While I have shown and described the preferred embodiment of my invention, it will be understood that minor changes in construction, combination and arrangement of parts may be made without departing from the spirit and scope of the invention as claimed.

Having thus described the invention, what I claim is:

In combination with an airplane, a hanger secured to said airplane and including spaced depending members and bearings on the lower extremities thereof, said bearings being of hook shape and pivotally connected to the extremities of the depending members, dogs engaging and normally restraining the bearings against pivotal movement on the depending members, an entangling net including a bar having the net secured thereto and wound thereon and journaled in the bearings and releasable therefrom on the release of the dogs from engagement with said bearings, a manually operated means for sustaining the bar against rotation and operable from within the airplane, a shaft journaled on the depending members and having one of the dogs secured thereto, and a hand operated means secured to said shaft and having the other dog formed thereon and extending into the airplane for manual actuation.

DIMITRI K. KOSICH.